United States Patent [19]

Hartley

[11] 3,979,023

[45] Sept. 7, 1976

[54] DISPENSER FOR FLOWABLE MATERIAL

[76] Inventor: Ezra Dale Hartley, 2700 Jalmia Drive, Los Angeles, Calif. 90046

[22] Filed: Sept. 5, 1975

[21] Appl. No.: 610,746

[52] U.S. Cl. .............................. 222/61; 222/144.5; 222/309; 222/334
[51] Int. Cl.² .......................................... B67D 5/14
[58] Field of Search .......... 222/334, 309, 61, 144.5, 222/129.1, 129.3, 129.4, 144.5

[56] References Cited
UNITED STATES PATENTS

| | | |
|---|---|---|
| 2,585,172 | 2/1952 | Reynolds .......................... 222/334 X |
| 3,598,287 | 8/1971 | de Man ............................ 222/334 X |
| 3,715,061 | 2/1973 | Morine et al. ...................... 222/334 |
| 3,830,405 | 8/1974 | Jaeger ........................... 222/144.5 X |

*Primary Examiner*—Allen N. Knowles
*Assistant Examiner*—Hadd Lane
*Attorney, Agent, or Firm*—Gordon L. Peterson

[57] ABSTRACT

A dispenser for flowable material comprising a pump, a dispensing head coupled to the outlet of the pump, a control valve for controlling pump operation, and a manually operable valve carried by the dispensing head for controlling the control valve. The pump includes a rolling diaphragm which is moved on the discharge stroke by fluid under pressure supplied from the control valve and is moved on the intake stroke by a spring. None of the controls for the dispenser are electrical.

16 Claims, 10 Drawing Figures

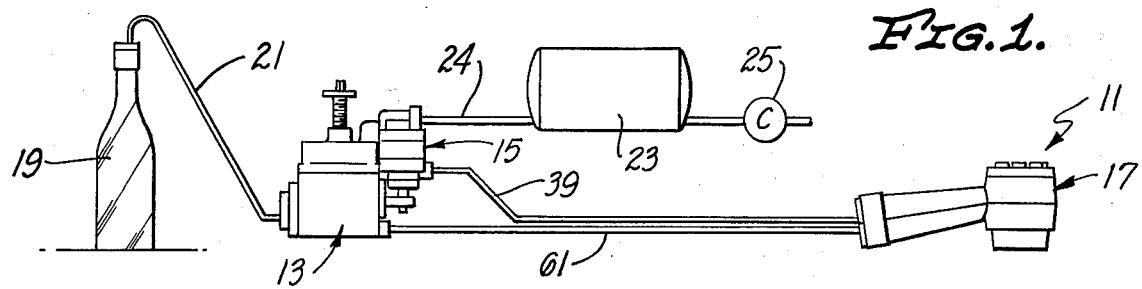
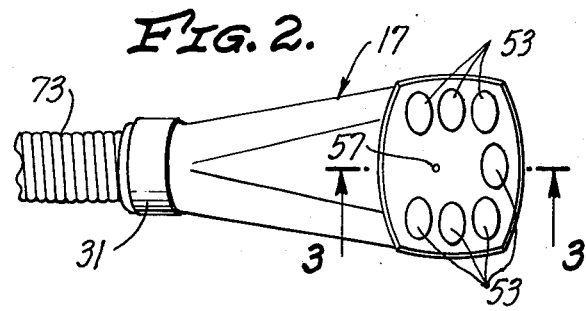
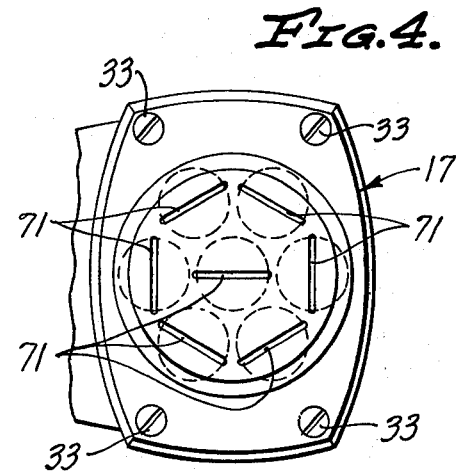
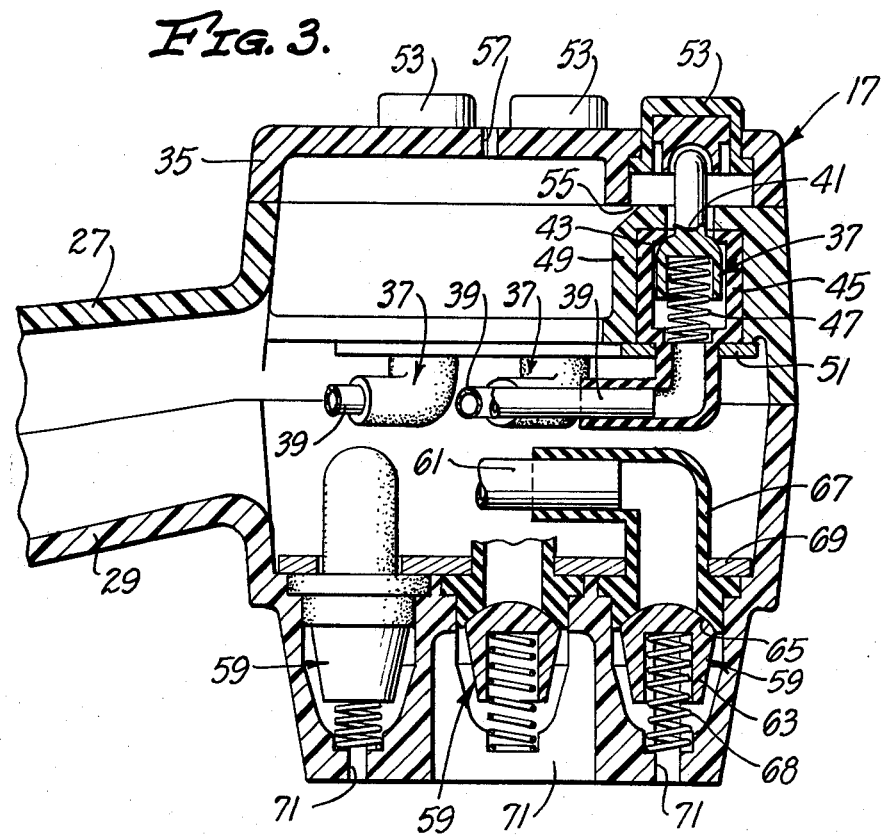

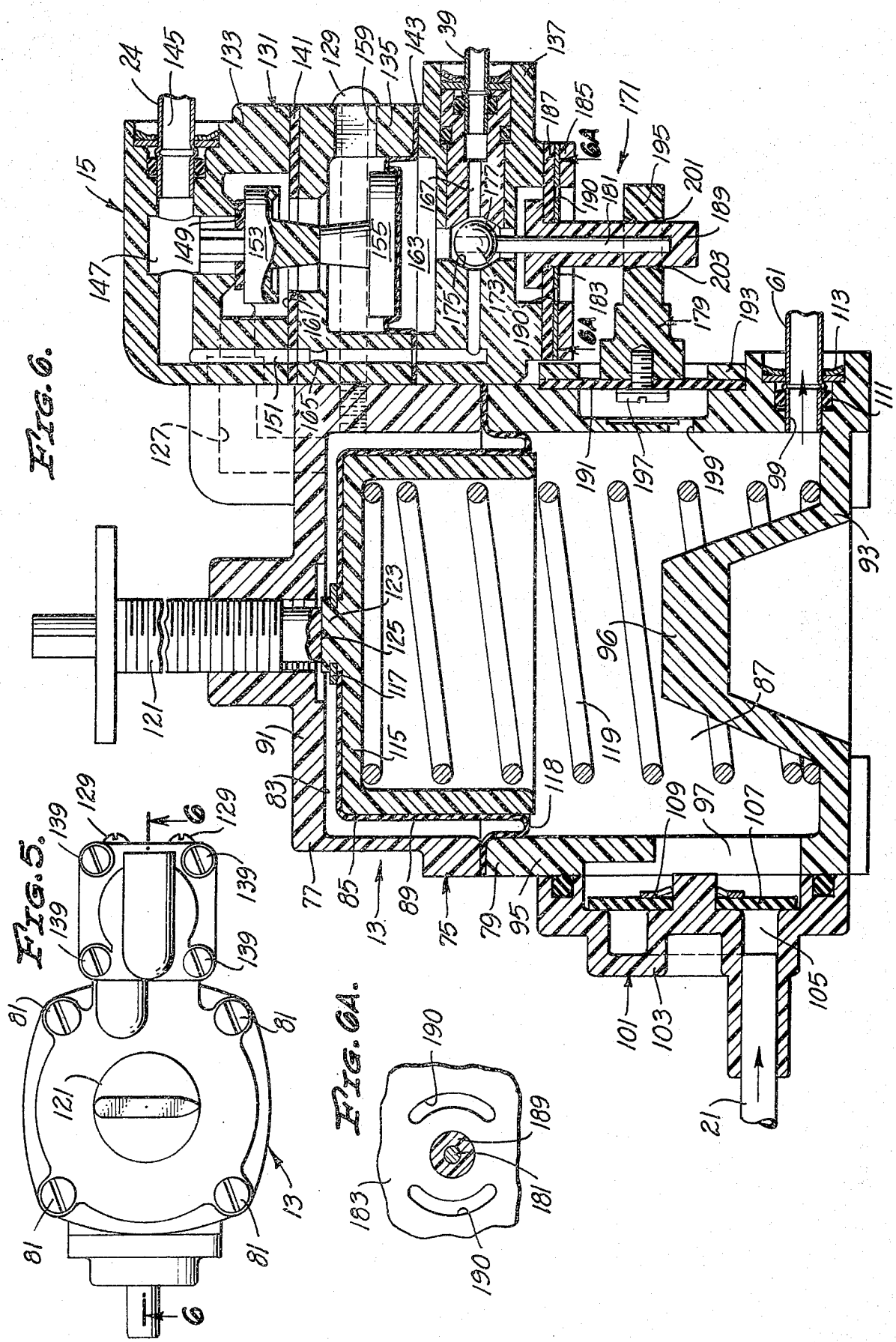

DISPENSER FOR FLOWABLE MATERIAL

BACKGROUND OF THE INVENTION

There are many instances in which it is necessary to dispense an accurately metered volume of a selected liquid. For example, this need rises in beverage dispensing in that a measured portion of the beverage selected by the customer must be dispensed. In the past, considerable attention has been given to dispensers for alcoholic beverages. In a typical prior art dispenser for alcoholic beverages, the user pushes a button corresponding to a particular beverage, and in response a metered quantity of the selected beverage is dispensed. This concept is desirable because it provides for accurate and rapid dispensing, and in some instances for inventory control. Unfortunately, prior art dispensers of this type are relatively complex. This in turn increases the cost of the unit. Other dispensers are dangerous in that they require pressurizing of the beverage bottle.

Another problem with prior art units is that the controls are, at least in part, electric. Typically, the dispenser includes a dispensing head from which the liquid is dispensed and which contains electrical switches for selecting the beverage to be dispensed. The switches in turn operate solenoids which provide the dispensing control function. Because of the inherent presence of liquid around a bar or other beverage dispensing counter, there is a danger of shorting out the electrical controls.

SUMMARY OF THE INVENTION

The present invention provides a simple, inexpensive, and reliable dispenser which does not use electrical controls or pressurized bottles. Accordingly, the dispenser of this invention is free from explosive or electrical dangers.

To avoid bottle pressurization, the liquid is pumped from the bottle or other container in which it is stored. This can advantageously be accomplished by a positive displacement type of pump which includes a housing having a cavity and a movable pumping member at least partially in the cavity. The housing and the pumping member define a dispensing chamber which has an inlet and an outlet. The pumping member is movable on an intake stroke to draw liquid from the bottle into the dispensing chamber and on a discharge stroke to force the liquid through the outlet.

Although the pumping member could be a piston, a rolling diaphragm is preferred because a piston can cause leakage particularly if a particle is caught between the piston and the housing. A rolling diaphragm, on the other hand, will not leak unless the diaphragm ruptures, an event which is most unlikely to occur.

The pumping member is preferably driven on the discharge stroke by fluid under pressure admitted to the cavity in the housing by a control valve. Power for the intake stroke is provided by a spring. Use of a spring for the intake stroke prevents the direction of the differential pressure across the diaphragm from reversing and permits the present invention to use a roling diaphragm. A spring is also preferred because the strength of the spring controls the pressure differential across the pumping member. This allows use of a molded rolling diaphragm, which is many times less expensive than a fabric reinforced rolling diaphragm, as the pumping member and gives the diaphragm a longer life.

The dispenser includes a dispensing head coupled to the outlet of the dispensing chamber. The dispensing head has a discharge opening and a discharge valve is carried by the dispensing head adjacent the discharge opening. The discharge valve is responsive to a pressure increase which is created on the discharge stroke of the pumping member to automatically open to discharge the liquid. By placing the discharge valve closely adjacent the discharge opening, dripping is minimized. Also, by elongating the discharge opening, the tendency of the liquid to splash is reduced.

The control valve responds to a fluid signal to control the supply of fluid under pressure to the housing and the exhaust of fluid under pressure from the housing. Because the control valve responds to a fluid signal rather than an electrical signal, the controls for the dispenser can be entirely fluid operated and all electrical controls can be eliminated. Accordingly, the controls cannot be shorted out.

The control valve can advantageously include a valve body having an inlet communicable with a source of fluid under pressure, dispensing chamber port means, a vent opening, and a control chamber. The control valve also includes a valve element which is movable between a first position in which it blocks flow from the inlet to the dispensing chamber port means and allows flow from the dispensing chamber port means to the vent opening and a second position in which it allows flow from the inlet to the dispensing chamber port means and blocks flow from the dispensing chamber port means to the vent opening. In other words, in the first position the control valve vents the cavity to the pump housing to allow the spring to move the pumping member on the intake stroke, and in the second position the control valve supplies fluid under pressure to the cavity of the pump housing tp move the pumping member on the discharge stroke.

The control valve includes a pressure responsive control element which at least partially defines the control chamber and restricted passage means providing communication between the inlet and the control chamber so that fluid under pressure can be supplied to the control chamber, but at a retarded rate. The pressure responsive control element is responsive to the pressure in the control chamber to control the position of the valve element. The pressure in the control chamber is in turn controlled by the fluid signal referred to above. In a preferred embodiment, a manually operable vent valve is carried by the dispensing head for venting the pressure in the control chamber to cause the pressure responsive control element to operate the valve element. In this instance the fluid signal is the venting of fluid under pressure from the control chamber.

The present invention also provides optional inventory control features. To this end, valve means is provided which is responsive to the discharge stroke of the pumping member for closing the restricted passage means. This prevents the re-establishment of pressure in the control chamber during the discharge stroke regardless of the manner in which the manually operated vent valve is manipulated. In other words, once the discharge stroke is commenced, the pumping member moves through the full discharge stroke independently of the manner in which the vent valve is manually manipulated. In addition, the valve means is responsive to the intake stroke of the pumping member for closing the passage between the control chamber and the vent valve. This allows pressure to be reestablished in the control chamber during the intake stroke regardless of how the manually operated vent valve is manipulated. This assures that the pumping member will run through the full intake stroke independently of how the manually operable vent valve is manipulated during the intake stroke.

The length of the discharge stroke of the pumping member is directly proportional to the volume of the liquid dispensed. With the present invention, the length of the discharge stroke can be controlled by adjusting either or both of the starting or stopping locations for the discharge stroke. One advantage of controlling the ending location of the stroke is that the end of the stroke can be adjusted without dispensing any of the liquid as a result of making the adjustment.

Another optional feature of the present invention is means for increasing the volume of the dispensing chamber in response to increases in the liquid volume within the chamber. Such increases in volume may be brought about, for example, by an increase in temperature. Such means may include, for example, a pressure responsive element mounted to extend varying distances into the dispensing chamber. Upon expansion of the liquid in the dispensing chamber, the pressure responsive element is forced at least part way out of the dispensing chamber to increase the volume of the dispensing chamber.

The invention includes numerous other features and advantages which can best be understood by reference to the following description taken in connection with the accompanying illustrative drawing.

BRIEF DESCRIPTION OF THE DRAWINGS

FIG. 1 is a partially schematic, side elevational view of a dispenser constructed in accordance with the teachings of this invention.

FIG. 2 is a fragmentary, top plan view of the dispensing head.

FIG. 3 is an enlarged, fragmentary, sectional view taken generally along line 3—3 of FIG. 2.

FIG. 4 is a fragmentary bottom plan view of a portion of the dispensing head.

FIG. 5 is a top plan of the pump and one form of control valve.

FIG. 6 is an enlarged sectional view taken generally along line 6—6 of FIG. 5.

FIG. 6A is a sectional view taken generally along line 6A—6A of FIG. 6.

DESCRIPTION OF THE PREFERRED EMBODIMENTS

Figure 7:
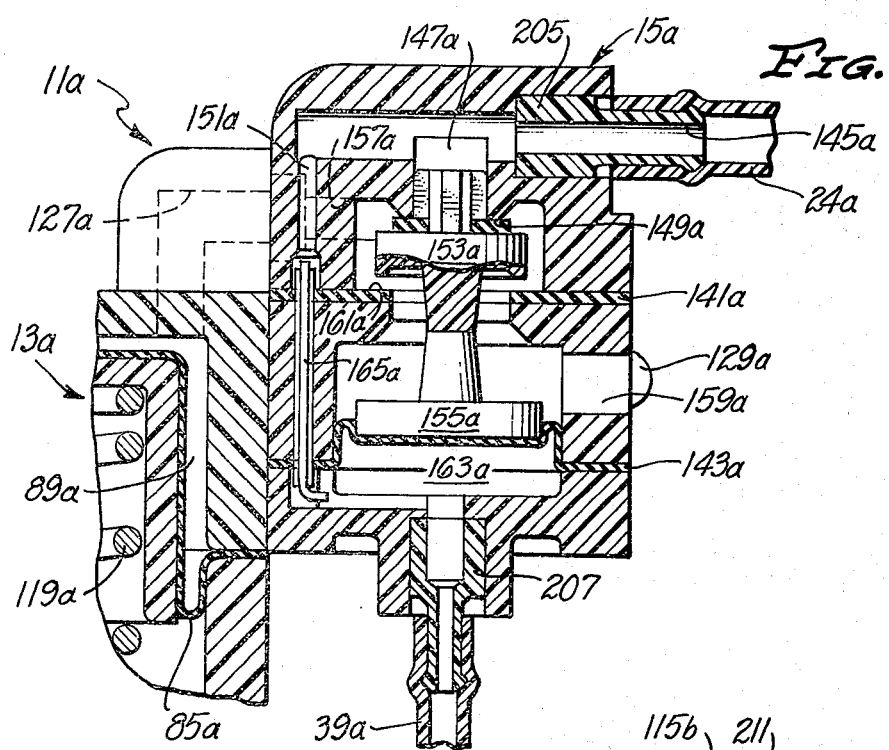
FIG. 7 is a fragmentary sectional view similar to a portion of FIG. 6 and illustrating a second form of control valve.

FIG. 1 shows a dispenser 11 which includes a pump 13, a control valve 15, and a dispensing head 17. The pump 13 draws liquid from a bottle 19 through a conduit 21. The control valve 15 is supplied with fluid under pressure through a conduit 24 from a suitable source which may include an accumulator 23 and a compressor 25.

One of the pumps 13 and control valves 15 is provided for each different kind of liquid which is to be dispensed. In the embodiment illustrated, the dispenser 11 is adapted to dispense seven different kinds of liquid, and accordingly seven identical pumps 13 and seven identical control valves 15 are provided. Each of the pumps 13 is connected by an associated one of the conduits 21 to an associated one of the bottles 19. Each of the bottles 19 contains a different kind of liquid. Only one dispensing head 17, accumulator 23, and compressor 25 are required regardless of the number of the pumps 13 and the control valves 15.

The dispenser 11 is described herein as a dispenser for alcoholic beverages; however, the invention is not limited to that purpose. Rather, the dispenser 11 can be used for dispensing a variety of different kinds of beverages, other liquids, and extrudable materials such as certain food products. Thus, the dispenser 11 can be used to dispense any kind of flowable material.

The dispensing head 17 may assume various different configurations. In the embodiment illustrated, the dispensing head 17 (FIGS 1-4) includes half sections 27 and 29 of molded plastic material held together at one end by a band 31 (FIG. 2) and at the other end by a plurality of screws 33 (FIG. 4). The dispensing head 17 also includes a bezel 35 of molded plastic material suitably attached to the half section 27 as by the screws 33.

One function of the dispensing head 17 is to carry an appropriate mechanism for supplying a fluid signal to the control valve 15 indicating that a particular liquid is to be dispensed. This is accomplished by a plurality of identical vent valves 37 (only one being illustrated in detail in FIG. 3) each of which is coupled by means of a conduit 39 to an associated pump 13. One of the vent valves 37 is provided for each of the pumps 13. Each of the vent valves 37 includes a valve element 41, a valve seat 43 formed on a plastic insert 45, and a spring 47 for urging the valve element into contact with the valve seat. The insert 45 is tubular and is mounted in the half section 27 in any suitable way such as by a wall 49 molded integrally with the half section 27 and a hold down plate 51 which may be attached in any suitable manner, such as by screws, to the half section 27. One end of the insert 45 is coupled to the conduit 39.

Manually operable means are provided for opening each of the vent valves 37. Although such means may assume different configurations, in the embodiment illustrated, it includes a push button 53 for each of the vent valves 37. Each of the push buttons 53 is mounted for movement on the bezel 35 and normally urged to an extreme outward position by the spring 47 of the associated vent valve. By manually depressing a selected one of the push buttons 53, communication is provided from the conduit 39 through the associated vent valve 37 and an opening 55 to a vent opening 57. Exposing of the conduit 39 to atmospheric pressure provides a fluid signal to the control valve 15 which is used as described below to cause the pump 13 to dispense a metered quantity of selected liquid.

A second function of the dispensing head 17 is that it dispenses the liquid pumped by the pump 13. To accomplish this, a plurality of discharge valves 59 are carried by the dispensing head 17 with one of the discharges valves being provided for each of the pumps 13. A conduit 61 connects each of the discharge valves 59 with the associated pump 13. Each of the discharge valves 59 includes a valve element 63, a valve seat 65 formed on a tubular insert 67, and a spring 68. The insert 67 is mounted on the half section 29 in any suitable manner such as by a hold down plate 69 which in turn can be attached to the half section 29 by screws (not shown). Each of the discharge valves 59 serves as a check valve which opens in response to a predetermined pressure in the conduit 61. When one of the discharge valves 59 opens, it provides communication between the associated conduit 61 and an associated discharge opening 71 in the dispensing head 17. Although each of the discharge openings 71 could be of various different configurations, an elongated slot is preferred because it minimizes the tendency of the dispensed liquid to splash when it strikes the surface.

Each of the conduits 39 and 61 is preferably contained within a flexible corrugated tube 73 (FIG. 2). One end of the tube 73 is received within, and attahced to, one end of the dispensing head 17 and the other end of the tube 73 is suitably attached to the pump 13 and the control valve 15.

FIGS. 5 and 6 show one preferred form of the pump 13 and the control valve 15. The pump 13 can be used in any orientation. However, an orientation with the outlet 99 toward the top is preferred because it facilitates air removal from the pump. The pump 13 includes a housing 75 which is formed in substantial part by housing sections 77 and 79 suitably interconnected as by screws 81 (FIG. 5).

The housing 75 has a cavity 83 therein. A peripheral region of a rolling diaphragm 85 is clamped between the housing sections 77 and 79 and extends transversely across the cavity 83 to divide the cavity into a dispensing chamber 87 and an actuating chamber 89.

In the embodiment illustrated, the housing 75 is generally cylindrical and has opposite end walls 91 and 93 and a generally cylindrical peripheral wall 95. The end wall 93 has a central projection 96 which projects axially into the dispensing chamber 87. The peripheral wall 95 has openings defining an inlet 97 and an outlet 99 for the dispensing chamber 87. A check valve 101 is suitably mounted on the housing 75 in communication with the inlet 97. Although the check valve 101 could be of various different constructions, in the embodiment illustrated, it includes a molded plastic housing 103 defining an inlet passage 105, a resilient valve element 107 normally resiliently closing the inlet passage 105, and a spring clip 109 for mounting the valve element on the housing 103.

The conduit 21 is coupled to the inlet passage 105 so that it can provide liquid from the associated bottle 19 to the dispensing chamber 87. The conduit 61 is appropriately coupled to the housing 75 and is in communication with the outlet 99 so that it can transmit liquid from the dispensing chamber 87 to the dispensing head 17. The conduit 61 is sealed to the housing 75 in any suitable manner such as by an O-ring seal 111. The conduit 61 is retained on the housing by a suitable connector 113.

The rolling diaphragm 85 is molded from a flexible, resilient material such as rubber, and it is not fabric reinforced. A plunger 115 in the form of a cylindrical cup is attached to a central region of the rolling diaphragm 85 in any suitable manner such as by a spring clip 117. The plunger 115 supports the diaphragms 85. The plunger 115 is constructed of a suitable rigid material such as a rigid plastic. The rolling diaphragm has an annular channel 118 opening into the chamber 89.

The diaphragm 85 and the plunger 115 are movable together on an intake stroke and a discharge stroke. A coil compression spring 119 within the dispensing chamber 87 acts between the end wall 93 and the plunger 115 to provide power for the intake stroke of the diaphragm 85. The location of the diaphragm 85 at the end of the intake stroke is controlled by an adjustable stop which, in the embodiment illustrated, is in the form of a screw 121 which is threaded into the end wall 91. A central protruding portion 123 of the plungeer 115 projects through the diaphragm 85 and engages a lower end face 125 of the screw 121 to define the end of the intake stroke.

Power for the discharge stroke is provided by a fluid under pressure which is supplied to the actuating chamber 89 from the accumulator 23 via the control valve 15 and a passage 127.

The control valve 15 in the embodiment illustrated is mounted on the housing section 77 by a plurality of screws 129. The control valve 15 includes a valve housing 131 which in turn includes housing sections 133, 135 and 137 suitably interconnected as by screws 139 (FIG. 5). A resilient annular disc-type seal 141 is sandwiched between the housing sections 133 and 135, and a peripheral region of a rolling diaphragm 143 is clamped between the housing sections 135 and 137.

The control valve 15 has an inlet 145 which communicates with the fluid under pressure in the accumulator by means of the conduit 24, one end of which is suitably sealed and affixed to the control valve 15. The control valve 15 has an inlet passage 147 which leads from the inlet 145 a valve seat 149 and to a restricted passage 151. The control valve 15 includes a valve element 153 which can be urged against the valve seat 149 by a pressure responsive control element 155. A resilient seal 156 is carried by the valve element 153. A passage 157 provides communication between the valve element 153 and the passage 127, and a vent opening 159 provides communication between the passage 157 at atmosphere. The passage 157 may include or constitute dispensing chamber port means. The seal 149 defines a valve seat 161 along the inner periphery of the seal.

With the valve element 153 engaging the valve seat 149 as shown in FIG. 6, fluid in the actuating chamber 89 of the pump 13 can be vented to atmosphere by way of the passages 127 and 157 and the vent opening 159. Such venting of the actuating chamber 89 is necessary to allow the spring 119 to move the rolling diaphragm 85 on its intake stroke. During this period, the engagement of the valve element 153 and the valve seat 149 blocks flow from the inlet passage 147 to the pump 13. Conversely, with the valve element 153 engaging the valve seat 161, communication between the vent opening 159 and the pump 13 is blocked and fluid under pressure from the inlet passage 147 can pass through the passages 157 and 127 to the actuating chamber 89 of the pump 13. This permits the fluid under pressure to drive the rolling diaphragm 85 on its discharge stroke.

Because the fluid under pressure does not contact the liquid in the dispensing chamber 87, various different kinds of pressurized fluid can be used. For example, compressed air or compressed carbon dioxide can be utilized as the fluid under pressure.

The valve element 153 is controlled by the pressure responsive control element 155 and a control chamber 163 formed in the housing 131. The control chamber 163 is provided with fluid under pressure from the inlet passage 147 by way of the restricted passage 151. The restricted passage 151 may provide a restriction to fluid flow in a variety of ways. For example, a separate restrictor may be inserted into the passage, or all or a portion of the passage 151 may be of reduced diameter. In the embodiment illustrated, the restricted passage 151 has a restrictor 165 which is shown as a region of reduced cross sectional area. The control chamber 163 can also communicate with one of the vent valves 37 in the dispensing head 17 by way of a passage 167 in the control valve 15 and an associated conduit 39.

The pressure responsive control element 155 is suitably attached to and is driven by the rolling diaphragm 143. The rolling diaphragm 143 is in turn movable in response to differential pressure existing on its opposite faces. Because the upper side (as viewed in FIG. 6) of the rolling diaphragm 143 is exposed to atmospheric pressure at all times, the rolling diaphragm can be controlled by the pressure in the control chamber 163. When there is no command for the pump 13 to operate, fluid under pressure is supplied from the inlet passage 147 through the restricted passage 151 to the control chamber 163. This pressure in the control chamber 163 is sufficient to maintain the valve element 153 in engagement with the seat 149 as shown in FIG. 6. To operate the pump 13, the user opens the associated vent valve 37 whereupon the control chamber 163 is exposed to atmosphere through the passage 167, the conduit 39, and the open vent valve 37. The opening of the control chamber 163 to atmosphere constitutes a fluid control signal. This enables the fluid under pressure in the inlet passage 147 to force the valve element 153 downwardly as viewed in FIG. 6 and into engagement with the valve seat 161.

The control valve 15 also provides for inventory control. This is accomplished by a valve 171 which includes a valve element 173, valve seats 175 and 177 at confronting ends of the passages 151 and 167, respectively, a valve operator 179, a stem 181, and a resilient slotted plate 183. In the embodiment illustrated, the valve element 173 is in the form of a spherical ball positioned in a chamber which is partially defined by the valve seats 175 and 177. The valve element 173 is mounted on the stem 181 which in turn is mounted on the resilient slotted plate 183. The plate 183 is suitably attached to the housing section 137 as by a retaining ring 185 and screws (not shown). To provide a fluid tight seal, a washer seal 187 is sandwiched between the plate 183 and the housing section 137, and a flanged, resilient tube seal 189 snugly receives the stem 181. The tube seal 189 is in turn mounted on the plate 183. The stem 181 and the plate 183 pivotally mount the valve element.

Specifically, the plate 183 is resilient and has slots 190 (FIG. 6A) which enable it to resiliently mount the valve element 173 for pivotal movement about an axis which is perpendicular to the stem 181. The plate 183 biases the valve element 173 toward a neutral position in which both the passages 151 and 167 are open. The valve element has a first closed position in which the valve element engages the valve seat 175 to close the passage 151, and a second closed position in which the valve element engages the valve seat 177 to close the passage 167.

When the pump 13 is not operating, the plate 183 maintains the valve element 173 in the neutral position. However, with the pump 13 actuated, the valve operator 179 first closes the restricted passage 151 and then the passage 167.

The valve operator 179 includes a sensing diaphragm 191 suitably mounted on the peripheral wall 95 of the motor 13 as by a retaining ring 193 and an actuating arm 195 which is attached to a central region of the diaphragm in any suitable manner such as by a screw 197. An opening 199 in the peripheral wall 95 provides communication between the dispensing chamber 87 and the sensing diaphragm 191. One end of the stem 181 and the seal 189 are received within an opening 201 of the actuating arm 195. The opening 201 is formed by a surface 203 which in convex in cross section as shown in FIG. 6.

On the discharge stroke of the rolling diaphragm 85, the pressure within the dispensing chamber 87 increases to move the sensing diaphragm 191 and the actuating arm 195 to the right as viewed in FIG. 6. This pivots the stem 181 counterclockwise (as viewed in FIG. 6) about a region of the plate 183 to move the valve element 173 into sealing engagement with the valve seat 175 to block off the restricted passage 151. Conversely, on the intake stroke of the rolling diaphragm 85, the pressure in the sensing chamber 87 reduces. This reduced pressure moves the sensing diaphragm 191 and the actuating arm 195 to the left as viewed in FIG. 6 to pivot the stem 181 clockwise to move the valve element 173 into sealing engagement with the valve seat 177. This blocks off the passage 167 and thus prevents communication between the control chamber 163 and the associated vent valve 37. With the rolling diaphragm 85 at the end of the intake stroke as shown in FIG. 6, the pressure within the dispensing chamber 87 is substantially atmospheric and the plate 183 holds the valve element in the neutral position and this allows the control chamber 163 to communicate with the restricted passage 151 and the passage 167.

In operation, the user depresses one of the push buttons 53 (FIGS. 2 and 3) of the dispensing head 17 which corresponds to a particular beverage. This opens the associated vent valve 37 (FIG. 3) to expose the control chamber 163 (FIG. 6) to atmospheric pressure. This allows the pressure in the inlet passage 147 to move the valve element 153 from the position shown in FIG. 6 to a position in which it sealingly engages the valve seat 161. With the valve element 153 in this latter positon fluid under pressure is supplied from the accumulator 23 through the control valve 15 to the actuating chamber 89 to move the rolling diaphragm 85 on its discharge stroke. Assuming that the dispensing chamber 87 has been previously filled with the beverage, then this beverage is pumped throughout the full discharge stroke through the conduit 61 to an associated one of the discharge valves 59. The discharge valve 59 opens in response to the increased pressure resulting from the discharge stroke to permit the beverage to be dispensed.

At the beginning of the discharge stroke, the valve operator 179 moves the valve element 173 to close off the restricted passage 151. This prevents the control chamber 163 from being refilled with fluid under pressure from the inlet pressure 147 during the discharge stroke. This assures that the full discharge stroke of the diaphragm 85 will occur regardless of whether or not the associated vent valve 37 is manipulated during this period.

At the completion of the discharge stroke, the pressure in the dispensing chamber 87 is reduced sufficiently to cause the valve operator 179 to move the valve element 173 away from the valve seat 175 thereby providing communication between the restricted passage 151 and the control chamber 163. Pressure in the control chamber 163 is, therefore, rapidly re-established notwithstanding the presence of the restrictor 165. This causes the diaphragm 143 to move the pressure responsive control element 155 upwardly to move the valve element 153 into engagement with the valve seat 149 as shown in FIG. 6. With the valve element 153 in this position, the actuating chamber 89 is open to the atmosphere via the vent opening 159 and the supply of fluid under pressure from the inlet passage 147 to the actuating chamber 89 is cut off. With the actuating chamber 89 open to atmosphere, the spring 119 moves the rolling diaphragm 85 upwardly on the intake stroke. This reduces the pressure in the dispensing chamber 87 so that the beverage from the associated bottle 19 is drawn through the conduit 21 and the check valve 101 into the dispensing chamber 87. At the beginning of the intake stroke, the reduced pressure in the dispensing chamber 87 causes the valve operator 179 to move the valve element 173 into engagement with the valve seat 177 to block communication between the control chamber 163 and the associated vent valve 37. Accordingly, the full intake stroke is obtained regardless of the manner in which the associated vent valve 37 is manipulated during this period.

With the embodiment of FIGS. 1–6, the operator loses control over the quantity of beverage dispensed once a dispensing cycle has been initiated. This is advantageous from the standpoint of beverage inventory control, and it assures that each customer, in the case of a bar, will receive a pre-established quantity of the beverage. Although the operator has no control over the quantity dispensed after the dispensing cycle has begun, it is possible to make adjustments in the delivery quantity prior to beginning a dispensing cycle. This is accomplished by turning of the screw 121 to adjust the position of the rolling diaphragm 85 at the end of the intake stroke. In other words, the volume of the dispensing chamber 87 can be varied by moving the location of the rolling diaphragm 85 at the beginning of the discharge stroke. If desired, the screw can be within a locked housing to prevent any unauthorized adjustments in the quantity dispensed.

FIG. 7 shows a dispenser 11a which is identical to the dispenser 11 except to the extent shown or described herein. Portions of the dispenser 11a corresponding to portions of the dispenser 11 are designated by corresponding reference numerals followed by the letter a. The primary difference between the dispenser 11 and the dispenser 11a is that the latter has no inventory control mechanism. Thus, the dispenser 11a does not have the valve operator 179 or the valve element 173. Except for structural details, the dispensers 11 and 11a are otherwise identical. With regard to the structural details, the dispenser 11a includes a restrictor 165a in the form of an elongated metal tube. The dispenser 11a also includes inserts 205 and 207 for attaching the conduits 24a and 39a to the control valve 15a.

The dispenser 11a operates identically to the dispenser 11 except that the operator never loses control over the quantity being dispensed. Specifically, when the control chamber 163a is vented by the associated vent valve 39, the valve element 153a moves out of engagement with the seat 149a and into engagement with the seat 161a. This admits fluid under pressure to the actuating chamber 89a to initiate the discharge stroke. The discharge stroke will proceed only for so long as the operator holds the associated vent valve 37 open. For example, if the operator closes the vent valve 37 before completion of the discharge stroke, pressure in the control chamber 163a will be quickly re-established to interrupt the discharge stroke and initiate the intake stroke. Conversely, if the operator holds the vent valve 37 open for a longer period, the discharge stroke can be completed. If the operator holds the vent valve 37 open after the discharge stroke has been completed, the intake stroke cannot begin, but obviously no additional liquid is dispensed. Thus, to enable the intake stroke to begin, the associated bent valve 37 must be closed to return the valve element 153a to the position shown in FIG. 7 in which the actuating chamber 89a is in communication with the vent opening 159a.

Figure 8:
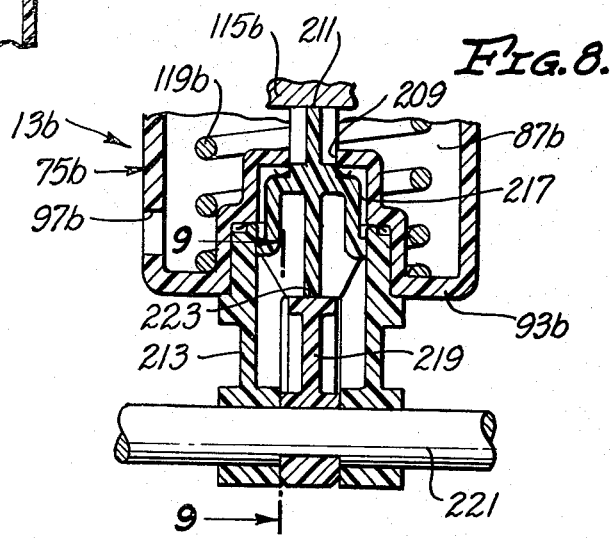
FIG. 8 is a fragmentary view illustrating a portion of a modified housing and alternate means for adjusting the stroke of the pump.
Figure 9:
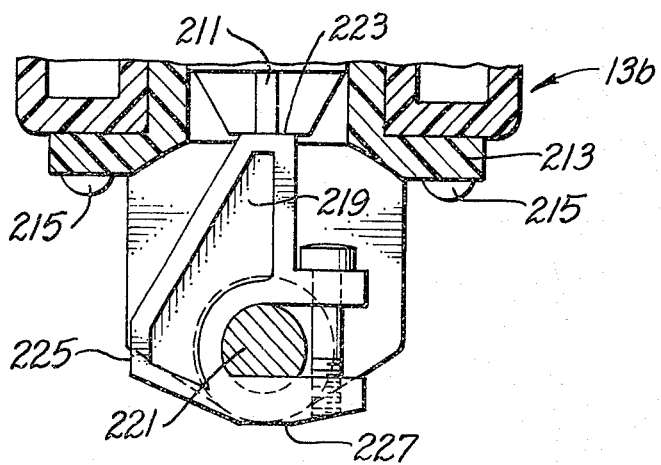
FIG. 9 is an enlarged, fragmentary, sectional view taken generally along line 9—9 of FIG. 8.

FIGS. 8 and 9 show a modified form of pump 13b which can be used with either the dispenser 11 or the dispenser 11a. Portions of the pump 13b corresponding to the portions of the pump 13 are designated by corresponding reference numerals followed by the letter b.

The pump 13b is identical to the pump 13 except to the extent specifically shown or described herein. One difference is that the length of the discharge stroke can be adjusted by adjusting the position of the rolling diaphragm at the bottom of its stroke.

The pump 13b includes a housing 75b in which the check valve 101 has been removed and which is similar to the pump 13a in that no sensing diaphragm 101 or other inventory control mechanism is shown. The housing 75b has an end walll 93b with an opening 209 which is adapted to receive a plunger 211 which projects into the dispensing chamber 87b. The plunger 211 is mounted for movement axially of the dispensing chamber 87 by a housing 213 which is attached to the housing 75b by screws 215. A diaphragm seal 217 is attached to the plunger 211 and is clamped between the housing 213 and 75b to provide a seal between the housing 75b and the plugner.

The position of the plunger 211 in the dispensing chamber 87b can be adjusted by a rotatable cam 219. The cam 219 is mounted on a rotatable shaft 221 which in turn is mounted for rotation in the housing 213. The cam 219 has a plurality of cam surfaces 223, 225, and 227, each of which is at a different distance from the center of rotation of the cam.

In the position shown in FIGS. 8 and 9, the cam surface 223 engages to support the plugner against movement out of the dispensing chamber 87. The plunger 115b is engageable with the plunger 211 to define the end of the discharge stroke. The end of the discharge stroke can be changed by rotating the cam 219 to bring either of the cam surfaces 225 or 227 into engagement with the plunger 211.

This cam adjustment feature can be used with or without the screw 121 which adjusts the position of the diaphragm 85 at the end of the intake stroke. One advantage of the construction of FIGS. 8 and 9 as compared with the screw 121 (FIG. 6) is that adjustment of the screw 121 to decrease the volume of the dispensing chamber inherently results in some loss of liquid whereas a corresponding adjustment can be made with the pump 13b without any loss of liquid.

Another feature of the modification of FIGS. 8 and 9 is that it provides some volume compensation of the dispensing chamber 87b for volume increases of the liquid in the dispensing chamber. The dispensing chamber 87b is filled with liquid at all times except during a dispensing cycle. Volume changes of the liquid in the dispensing chamber 87b can be brought about, for example, by temperature changes.

With the modification of FIGS. 8 and 9, the plunger 211 is pulled by the suction in the dispensing chamber 87b during the intake stroke slightly upwardly off of the cam surface 223. The diaphragm seal 217 allows this to occur. The volume of the dispensing chamber 87b is calculated assuming that the plunger 211 is drawn this slight additional distance into the dispensing chamber. Accordingly, if the liquid in the dispensing chamber 87b expands, it moves the plunger 211 partly out of the dispensing chamber to increase the volume of the dispensing chamber. Without this feature, expansion of the liquid in the dispensing chamber 87b might cause some leakage through the discharge valve 59.

Although exemplary embodiments of this invention have been shown and described, many changes, modifications and substitutions may be made by those with ordinary skill in the art without necessarily departing from the spirit and scope of this invention.

I claim:

1. A dispenser for flowable material comprising:
   a housing having a cavity therein;
   a pumping member at least partially in said cavity, said pumping member and said housing at least partially defining a dispensing chamber, said dispensing chamber having an inlet adapted to communicate with a supply of the flowable material and an outlet;
   said pumping member being movable on an intake stroke to allow the flowable material to enter the dispensing chamber and on a discharge stroke to force the flowable material in the discharge chamber through said outlet whereby the flowable material is dispensed;
   means coupled to said outlet for dispensing flowable material received from said outlet;
   means for moving said pumping member through said strokes;
   manually operable means for actuating said moving means; and
   first means responsive to the pressure in the pumping chamber as said pumping member moves on said intake stroke thereof for preventing interruption of said intake stroke by operation of said manually operatable means.

2. A dispenser as defined in claim 1 wherein said housing includes a wall forming a portion of the dispensing chamber, said first means including a resilient sensing diaphragm exposed to the pressure within the dispensing chamber whereby said sensing diaphragm is moved by pressure fluctuations within the dispensing chamber, said first means including means responsive to movements of said sensing diaphragm for preventing interruption of said intake stroke of said pumping member by operation of said manually operable means.

3. A dispenser as defined in claim 1 wherein said moving means includes means responsive to said manually operable means for controlling the pressure in said cavity outside of said dispensing chamber to thereby at least partially control the movement of said pumping member and said dispenser includes valve means responsive to the increase in pressure in the dispensing chamber during the discharge stroke for overriding the manually operable means during the discharge stroke to prevent interruption of the discharge stroke by the manually operable means.

4. A dispenser as defined in claim 1 wherein said moving means includes means responsive to said manually operable means for controlling the pressure in said cavity outside of said dispensing chamber to thereby at least partially control the movement of said pumping member and said first means includes valve means responsive to the decrease in pressure in the dispensing chamber during the intake stroke for overriding the manually operable means during the intake stroke to prevent interruption of the intake stroke by the manually operable means.

5. A dispenser for flowable material comprising:
   a housing having a cavity therein;
   a pumping member at least partially in said cavity, said pumping member and said housing at least partially defining a dispensing chamber within said housing, said dispensing chamber having an inlet adapted to communicate with a supply of the flowable material and an outlet;
   said pumping member being movable on an intake stroke to allow the flowable material to enter the dispensing chamber and on a discharge stroke to force the flowable material in the dispensing chamber through said outlet whereby the flowable material is dispensed;
   a dispensing head;
   means for coupling the dispensing head to said outlet whereby flowable material can be dispensed by said dispensing head;
   a control valve including a valve body having first and second valve seats, an inlet communicable with a source of fluid under pressure, dispensing chamber port means communicable with said cavity, a vent opening, and a control chamber;
   conduit means for providing communication between said control chamber and said dispensing head;
   said control valve including a valve element having first and second generally opposite faces, said control valve being movable between a first position in which the first face engages the first valve seat to block flow from the inlet to the dispensing chamber port means and to allow flow from the dispensing chamber port means to the vent opening and a second position in which the second face engages the second valve seat to block flow from the dispensing chamber port means to the vent opening and to allow flow from the inlet to the dispensing chamber port means;
   said control valve including restricted passage means providing communication between said inlet and said control chamber whereby fluid under pressure can be supplied to said control chamber and a pressure responsive control element at least partially defining said control chamber for urging the valve element to said first position when fluid under a first pressure exists in the control chamber;
   vent valve means for venting the control chamber to reduce the pressure in the control chamber; and
   said valve element being in communication with the inlet so that upon venting of the control chamber the fluid under pressure from the inlet forces the valve element to the second position.

6. A dispenser as defined in claim 5 wherein said vent valve means is carried by said dispensing head, said dispenser includes manually operable means carried by said dispensing head for operating said vent valve means, said dispensing head has a discharge opening through which the flowable material can be discharged, said dispenser includes discharge valve means carried by said dispensing head adjacent said discharge opening and responsive to a pressure increase created by moving said pumping member on the discharge stroke to open to permit discharge of the flowable material therethrough.

7. A dispenser for flowable material comprising:
a housing having a cavity therein;
a pumping member at least partially in said cavity, said pumping member cooperating with said housing to at least partially define a dispensing chamber, said dispensing chamber having an inlet adapted to communicate with a supply of the flowable material and an outlet;
said pumping member being movable on an intake stroke to allow the flowable material to enter the dispensing chamber and on a discharge stroke to force the flowable material in the dispensing chamber through said outlet whereby the flowable material is dispensed;
a dispensing head;
first means for coupling the dispensing head to said outlet whereby flowable material can be dispensed by said dispensing head;
control valve means communicable with a source of fluid under pressure for supplying the fluid under pressure to the housing to move said pumping member on the discharge stroke;
first valve means for providing a fluid signal;
manually operable means at least partially carried by said dispensing head for operating said first valve means;
said control valve means including means responsive to said fluid signal to supply the fluid under pressure to said housing to move said pumping member on the discharge stroke whereby the flowable material is dispensed at the dispensing head;
said dispensing head having a discharge opening through which the flowable material can be discharged;
discharge valve means carried by said dispensing head adjacent said discharge opening and responsive to a pressure increase created by moving said pumping member on the discharge stroke to open to permit discharge of the flowable material therethrough; and
movable means for controlling the location of said pumping member at the end of at least one of the discharge stroke and the intake stroke.

8. A dispenser as defined in claim 7 including a spring in said cavity for moving said pumping member on the intake stroke.

9. A dispenser as defined in claim 7 wherein said pumping member includes a plunger and a rolling diaphragm.

10. A dispenser as defined in claim 7 wherein said control valve means includes a control chamber to control the control valve means, said first valve means includes a vent valve, said dispenser including conduit means for providing communication between the control chabmer and the vent valve whereby said control chamber can be vented by opening of the vent valve to thereby provide said fluid signal.

11. A dispenser as defined in claim 7 wherein said discharge opening is in the form of an elongated slot.

12. A dispenser as defined in claim 7 including a pressure responsive element mounted to extend varying distances into said dispensing chamber whereby expansion of the flowable material in the dispensing chamber moves the pressure responsive element at least partially out of the dispensing chamber to increase the volume of the dispensing chamber so that it can accommodate the increased volume of the flowable material.

13. A dispenser for flowable material comprising:
a housing having a cavity therein;
a pumping member at least partially in said cavity, said pumping member and said housing at least partially defining a dispensing chamber within said housing, said dispensing chamber having an inlet adapted to communicate with a supply of the flowable material and an outlet;
said pumping member being movable on an intake stroke to allow the flowable material to enter the dispensing chamber and on a discharge stroke to force the flowable material in the dispensing chamber through said outlet whereby the flowable material is dispensed;
a dispensing head;
means for coupling the dispensing head to said outlet whereby flowable material can be dispensed by said dispensing head;
a control valve including a valve body having an inlet communicable with a source of fluid under pressure, dispensing chamber port means communicable with said cavity, a vent opening, and a control chamber;
conduit means for providing communication between said control chamber and said dispensing head;
said control valve including a valve element movable between a first position in which it blocks flow from the inlet to the dispensing chamber port means and allows flow from the dispensing chamber port means to the vent opening and a second position in which it allows flow from the inlet to the dispensing chamber port means and blocks from the dispensing chamber port means to the vent opening;
said control valve including a pressure responsive control element at least partially defining said control chamber for controlling the position of the valve element and restricted passage means providing communication between said inlet and said control chamber whereby fluid under pressure can be supplied to said control chamber;
vent valve means for venting the control chamber to cause the pressure responsive control element to operate the valve element; and
valve means responsive to the intake stroke of said member for closing said conduit means.

14. A dispenser as defined in claim 13 including valve means responsive to the discharge stroke of said pumping member for closing said restricted passage means.

15. A dispenser as defined in claim 13 including first valve means for opening and closing said restricted passage means and said conduit means and means for operating said first valve means, said operating means including a first movable pressure responsive element communicating with the dispensing chamber whereby the change in pressure within the dispensing chamber drives said first pressure responsive element to enable the first pressure responsive element to operate the first valve means.

16. A dispenser as defined in claim 15 wherein said first valve means includes a first valve element, means for pivotally mounting the first valve element, and first and second valve seats, said first pressure responsive element is drivingly coupled to the first valve element to pivot the latter between said first and second valve seats, the engagement of the first valve element and said first valve seat closing said restricted passage means and the engagement of said first valve element and said second valve seat closing said conduit means.

* * * * *